(12) United States Patent
Nakamura et al.

(10) Patent No.: US 9,692,130 B2
(45) Date of Patent: Jun. 27, 2017

(54) NEAR-FIELD COMMUNICATION ANTENNA, ANTENNA MODULE AND WIRELESS COMMUNICATIONS APPARATUS

(71) Applicant: HITACHI METALS, LTD., Minato-ku, Tokyo (JP)

(72) Inventors: Masaki Nakamura, Tottori (JP); Hiroshi Okamoto, Tottori (JP); Hirohiko Miki, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 114 days.

(21) Appl. No.: 14/389,054

(22) PCT Filed: Mar. 29, 2013

(86) PCT No.: PCT/JP2013/059610
§ 371 (c)(1),
(2) Date: Sep. 29, 2014

(87) PCT Pub. No.: WO2013/147194
PCT Pub. Date: Oct. 3, 2013

(65) Prior Publication Data
US 2015/0070233 A1    Mar. 12, 2015

(30) Foreign Application Priority Data
Mar. 30, 2012    (JP) .................................. 2012-079307

(51) Int. Cl.
H01Q 7/06    (2006.01)
G06K 19/077    (2006.01)
G06K 7/10    (2006.01)

(52) U.S. Cl.
CPC ......... *H01Q 7/06* (2013.01); *G06K 19/07777* (2013.01); *G06K 7/10237* (2013.01)

(58) Field of Classification Search
CPC ............... H01Q 7/08; G06K 19/07773; G06K 19/07777
(Continued)

(56) References Cited

U.S. PATENT DOCUMENTS 5,864,323 A *  1/1999  Berthon ............. G06K 19/0672
                                                          343/741
6,825,751 B1  11/2004  Kita et al.
(Continued)

FOREIGN PATENT DOCUMENTS

CN       1874064 A    12/2006
EP    0 782 214 A1     7/1997
(Continued)

OTHER PUBLICATIONS

Communication dated Sep. 25, 2015 from the State Intellectual Property Office of the People's Republic of China in counterpart Application No. 201380018371.6.
(Continued)

*Primary Examiner* — Dameon E Levi
*Assistant Examiner* — David Lotter
(74) *Attorney, Agent, or Firm* — Sughrue Mion, PLLC

(57) ABSTRACT

A near-field communication antenna comprising at least one annular coil, a planar, non-magnetic resin member holding the annular coil, a planar, soft-magnetic member overlapping the non-magnetic resin member via the annular coil, and terminals to which the conductor wire leads of the annular coil are connected, the annular coil being received in a circumferential recess along the periphery of the non-magnetic resin member lest that it projects from the periphery of the magnetic member, and the conductor wire leads of the annular coil being connected to the terminals through notches provided in the peripheral edge of the soft-magnetic member.

24 Claims, 14 Drawing Sheets

(58) Field of Classification Search
USPC .............................. 343/788; 455/41.1, 41.2
See application file for complete search history.

(56) References Cited

U.S. PATENT DOCUMENTS

| | | | |
|---|---|---|---|
| 7,545,336 B2 | 6/2009 | Naito et al. | |
| 7,755,552 B2* | 7/2010 | Schantz | G01C 21/206 343/718 |
| 8,077,106 B2* | 12/2011 | Sato | H01Q 1/3241 343/787 |
| 8,188,933 B2 | 5/2012 | Nakamura et al. | |
| 2006/0267853 A1 | 11/2006 | Naito et al. | |
| 2010/0156735 A1 | 6/2010 | Nakamura et al. | |
| 2010/0190436 A1* | 7/2010 | Cook | H04B 5/00 455/41.1 |

FOREIGN PATENT DOCUMENTS

| | | | | |
|---|---|---|---|---|
| JP | 04-101168 U | 9/1992 | | |
| JP | 101168 | * 9/1992 | ............ | G06K 19/00 |
| JP | 08-279714 A | 10/1996 | | |
| JP | 10-107531 A | 4/1998 | | |
| JP | 2005-094737 A | 4/2005 | | |
| JP | 2006-339757 A | 12/2006 | | |
| JP | 2007-110290 A | 4/2007 | | |
| JP | 2008-46671 A | 2/2008 | | |
| JP | 2010-033612 A | 2/2010 | | |
| JP | 2010-200061 A | 9/2010 | | |

OTHER PUBLICATIONS

International Search Report of PCT/JP2013/059610 dated Jun. 18, 2013 [PCT/ISA/210].

* cited by examiner

NEAR-FIELD COMMUNICATION ANTENNA, ANTENNA MODULE AND WIRELESS COMMUNICATIONS APPARATUS

CROSS REFERENCE TO RELATED APPLICATIONS

This application is a National Stage of International Application No. PCT/JP2013/059610, filed Mar. 29, 2013 (claiming priority based on Japanese Patent Application No. 2012-079307, filed Mar. 30, 2012), the contents of which are incorporated herein by reference in their entirety.

FIELD OF THE INVENTION

The present invention relates to an antenna for low-power wireless communications such as radio frequency identification (RFID) used in small wireless communications apparatuses such as mobile phones, etc., particularly to a near-field communication antenna applicable to the near-field communication (NFC) standard utilizing a communication frequency band of 13.56 MHz, and an antenna module and a wireless communications apparatus each comprising it.

BACKGROUND OF THE INVENTION

An IC card system is widely known as a system for near-field communications. For example, the IC card system disclosed in JP 2010-200061 A comprises, as shown in FIG. 24, a reader/writer 280, which may be called "antenna apparatus," and an IC card 285 acting as a transponder. The antenna apparatus 280 is an unbalanced circuit, which comprises a semiconductor 70, a noise filter (first filter) 71, a matching circuit 72, a low-pass filter (second filter) 73, and an antenna resonance circuit 66. The semiconductor 70 comprises a transmission circuit, a reception circuit, a modulation circuit, a demodulation circuit, a controller, etc. The antenna resonance circuit 66 comprises a near-field communication antenna 1a, a resistor (not shown), and a resonance capacitor 65. The resonance frequency of the antenna resonance circuit 66 is set to an inherent frequency (for example, 13.56 MHz) used for communications, at which the real part of the impedance of the antenna resonance circuit 66 is substantially in a short-circuited state. The antenna resonance circuit 66 is connected to the semiconductor 70 via the impedance-matching circuit 72.

An output terminal Tx connected to the modulation circuit in the transmission circuit in the semiconductor 70 is connected to the impedance-matching circuit 72 via the first filter 71 for EMC. An input terminal Rx connected to the demodulation circuit in the reception circuit in the semiconductor 70 is connected to a connecting point of the first filter 71 and the impedance-matching circuit 72 via the second filter 73 comprising a capacitor connected in series to a resistor.

The operation of the transmission circuit and the reception circuit is controlled by the controller. Signals having a frequency (for example, 13.56 MHz) corresponding to the tuning frequency is given from the oscillator to the transmission circuit, modulated by a predetermined protocol, and supplied to the antenna resonance circuit 66. The near-field communication antenna 1a of the antenna resonance circuit 66 is magnetically coupled to the near-field communication antenna 1b of the IC card 285 at a predetermined coupling coefficient. Accordingly, when the IC card 285 as a transponder is placed close to the near-field communication antenna 1a, the near-field communication antenna 1b in the IC card 285 is magnetically coupled to the near-field communication antenna 1a, resulting in electric power transmission to the integrated circuit 68 of the IC card 285 by electromagnetic induction, and data transmission according to a predetermined protocol (for example, ISO 14443, 15693, 18092, etc.).

As a near-field communication antenna (simply called "antenna" below) used for such system, JP 2005-094737 A proposes an antenna 200 comprising, as shown in FIG. 25, a single-flange, soft-magnetic core comprising a cylindrical body 351 and a rectangular, planar flange 355, and a coil 352 wound around the body 351, conductor wire ends 353, 353 of the coil 352 being connected to terminals 356, 356 disposed on the side and bottom surfaces of the flange 355, and a non-magnetic body having a flat upper surface (not shown) being disposed on the coil 352 and the body 351. Because magnetic flux generated by the coil 352 predominantly passes through the soft-magnetic core, a high-density magnetic flux is directed upward from the coil 352.

A wireless communications apparatus such as a mobile phone, etc. comprises, in a casing having a limited size, pluralities of antennas such as a main antenna mostly used for oral communications, a near-field communication antenna, an inductive charging antenna, a digital TV antenna, etc., together with other circuit devices. Accordingly, a low-height, near-field communication antenna with a small mounting area is demanded.

Even miniaturized near-field communication antennas are practically required to have communication distance of 30 mm or more. The miniaturization of an antenna requires the size reduction of a soft-magnetic member, but a small soft-magnetic member provides a reduced magnetic flux, resulting in difficulty to have a predetermined communication distance, and thus failing to carry out stable communications.

The self-resonance frequency of an antenna needs to be sufficiently higher than 13.56 MHz, a communication frequency band, generally recommended to be 40 MHz or more. In the antenna of JP 2005-094737 A, the coil 352 directly wound around the soft-magnetic body 351 has an inside region substantially filled with the soft-magnetic member, resulting in large self-inductance, providing the antenna with a low self-resonance frequency, which is near a communication frequency band. Such an antenna tends to have uneven self-inductance in a communication frequency band, because of the uneven parasitic reactance of the coil 352 and the uneven magnetic properties of the soft-magnetic member. Uneven self-inductance needs the adjustment of matching conditions of each antenna with other circuits, taking a lot of time and a many number of steps, thus resulting in cost increase of the antenna. Though self-inductance can be made smaller by providing the coil with a reduced number of turns or a reduced diameter, the coil generates less magnetic flux, resulting in a shorter communication distance.

To have enough communication distance, it may be considered to increase a magnetic field generated from the antenna with increased electric power supplied, but too much electric power supply magnetically saturates a magnetic body, or induces large electric power in a near mating antenna, likely destroying the semiconductor. To prevent it, a protecting circuit may be disposed, but it increases the number of parts.

It is possible to reduce the size of the soft-magnetic core disclosed in JP 2005-094737 A by using a soft-magnetic alloy having excellent magnetic properties such as permeability, a saturation magnetic flux density, core loss, etc., but it needs an insulating coating because the coil is directly wound around the soft-magnetic core. This increases the number of steps, resulting in higher production cost of the antenna. A resin member for protecting the coil 352 is also needed, resulting in a higher production cost.

OBJECTS OF THE INVENTION

Accordingly, an object of the present invention is to provide a surface-mountable, near-field communication antenna with easy coil protection, which can be made smaller while keeping enough directionality to a communication mate with enough communication distance.

Another object of the present invention is to provide an antenna module and a wireless communications apparatus each comprising such a near-field communication antenna.

DISCLOSURE OF THE INVENTION

The near-field communication antenna of the present invention comprises at least one annular coil, a planar, non-magnetic resin member holding the annular coil, a planar, soft-magnetic member overlapping the non-magnetic resin member via the annular coil, and terminals connected to conductor wire leads of the annular coil,
  the annular coil being disposed in a circumferential recess along a periphery of the non-magnetic resin member, lest that it projects from a periphery of the soft-magnetic member; and
  conductor wire leads of the annular coil being connected to the terminals through notches in a peripheral edge of the soft-magnetic member.

The inside of the annular coil is preferably entirely a non-magnetic region. With this structure, the soft-magnetic member acts as a magnetic yoke, suppressing increase in useless self-inductance.

The non-magnetic resin member has a fixed surface bonded to the soft-magnetic member, and a free surface opposite thereto. The circumferential recess of the non-magnetic resin member is (a) a circumferential step having a peripheral flange extending from a free surface, or (b) a circumferential groove having a pair of peripheral flanges extending from a fixed surface and a free surface. In the case of (a), the annular coil is disposed in a gap defined by the soft-magnetic member bonded to the non-magnetic resin member and a peripheral flange. In the case of (b), the annular coil disposed in the circumferential groove is separate from the soft-magnetic member by the height of one peripheral flange, resulting in low self-inductance. When a mounting board has a sufficiently wider ground surface than the mounting surface of the antenna, the antenna has a high Q value due to a gap between the annular coil and the soft-magnetic member. Further, the unevenness of a gap between the annular coil and the soft-magnetic member is smaller in the circumferential groove than in the circumferential step.

In any case, the circumferential recess has a function of positioning the annular coil, while protecting the annular coil from interference with other devices. The annular coil may be insert-molded integrally with the non-magnetic resin member.

The annular coil may be constituted by pluralities of coils. In the first example, the first and second coils are concentrically disposed, one end of a conductor wire of the first coil and one end of a conductor wire of the second coil are connected to each other to constitute a ground terminal, and the other end of a conductor wire of the first coil and the other end of a conductor wire of the second coil are connected to each other and connected to a signal terminal, the first and second coils being wound in an opposite direction when viewed from the ground terminal. The antenna having such structure is suitable for balanced circuits.

In the second example, the first and second coils are arranged in parallel on a surface of the soft-magnetic member, one end of a conductor wire of the first coil and one end of a conductor wire of the second coil being connected to a ground terminal, the other end of a conductor wire of the first coil and the other end of a conductor wire of the second coil being connected to signal terminals, and the first and second coils being wound in an opposite direction when viewed from the ground terminal. The antenna having such a structure can conduct transmission and reception simultaneously, with one coil used for transmission and the other coil used for reception.

The soft-magnetic member is preferably in a rectangular plate shape having opposing flat upper and bottom surfaces, and a side surface therebetween. Each of the upper and bottom surfaces may have an opening, a recess or a projection for positioning the non-magnetic resin member. In this case, the non-magnetic resin member has a projection, an opening or a recess engaging the opening, recess or projection of the soft-magnetic member. Because a projection of either one of the soft-magnetic member and the non-magnetic resin member is used as a reference, they are easily assembled without positional deviation. When the soft-magnetic member is provided with a projection, its position, size and shape are determined to have as little influence on self-inductance as possible.

The side surface of the soft-magnetic member preferably has notches through which the conductor wire leads of the annular coil pass. Conductor wire leads passing through the notches are connected to terminals on a bottom surface (on the opposite side to the non-magnetic resin member) of the soft-magnetic member or the substrate member bonded thereto. The side surface notches of the soft-magnetic member act to position the conductor wire leads, and prevent the conductor wire leads from projecting from the side surface of the antenna, thereby avoiding their disconnection.

The terminals, to which the conductor wire leads of the annular coil are connected, are also usable as electrodes for surface-mounting the antenna. The terminals can be formed by (a) printing or transferring an Ag paste, etc. in a terminal pattern onto an upper or bottom surface of the soft-magnetic member, and firing it, (b) attaching a printed board having a conductor pattern, or (c) attaching a resin substrate insert-molded with terminals.

When the substrate member is used, it is preferable that the substrate member is provided with a projection, that the soft-magnetic member is provided with an opening for receiving the projection of the substrate member, and that the non-magnetic resin member is provided with an opening or a recess for receiving the projection of the substrate member. In this case, too, the soft-magnetic member and the non-magnetic resin member are combined with a projection as a reference, making assembling free from positional deviation easy.

The non-magnetic resin member is preferably in a rectangular or circular shape similar to the soft-magnetic member when viewed from above. To withstand high temperature by solder reflow, etc., the non-magnetic resin member is preferably formed by heat-resistant engineering plastics such as liquid-crystal polymers, polyphenylene sulfide, etc. With the non-magnetic resin member provided with a flat portion on one surface, the antenna can easily be automatically mounted onto a circuit board, etc. by sucking.

The antenna module of the present invention comprises the above near-field communication antenna, reactance elements constituting a matching circuit, reactance elements constituting a noise filter, and an integrated circuit comprising a transmission circuit and a reception circuit, which are mounting onto a resin substrate.

The wireless communications apparatus of the present invention comprises the above near-field communication antenna.

DESCRIPTION OF THE PREFERRED EMBODIMENTS

Figure 1:
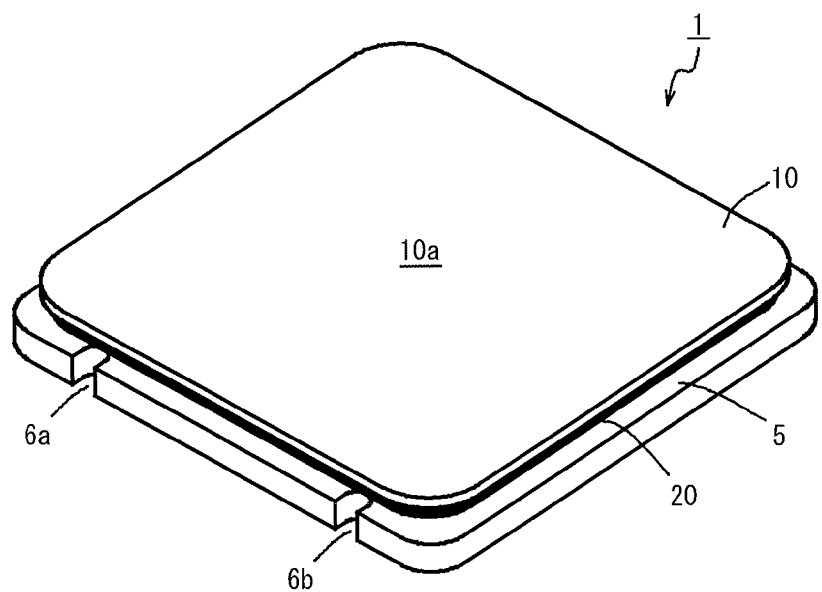
FIG. 1 is an upper perspective view showing a near-field communication antenna according to the first embodiment of the present invention.
Figure 2:
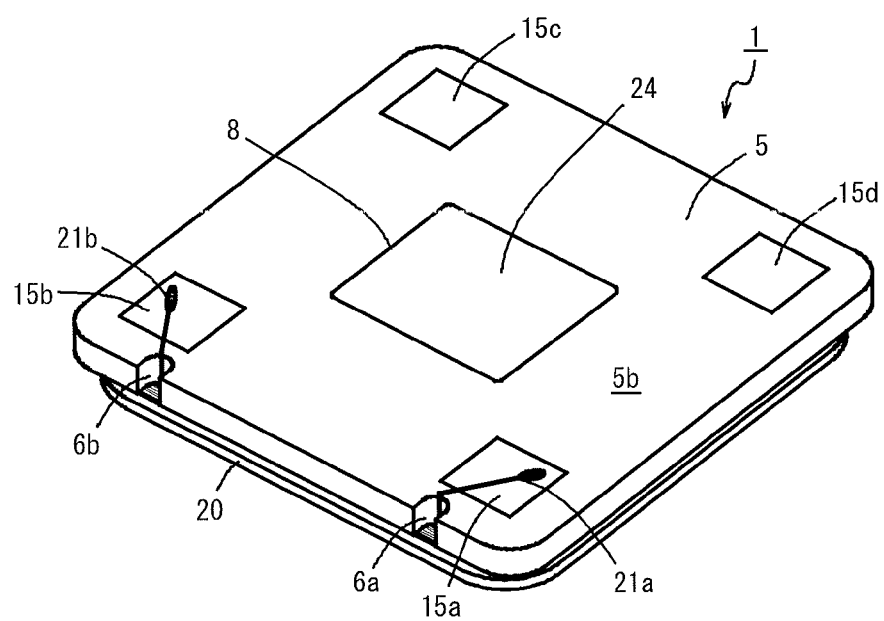
FIG. 2 is a lower perspective view showing a near-field communication antenna according to the first embodiment of the present invention.
Figure 3:
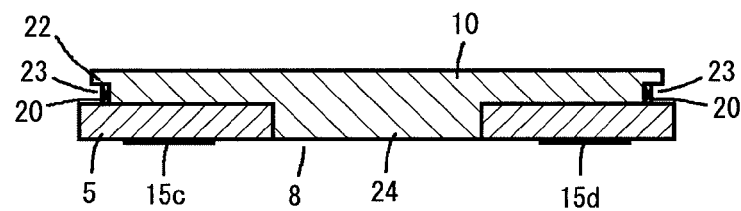
FIG. 3 is a cross-sectional view showing a near-field communication antenna according to the first embodiment of the present invention.
Figure 4:
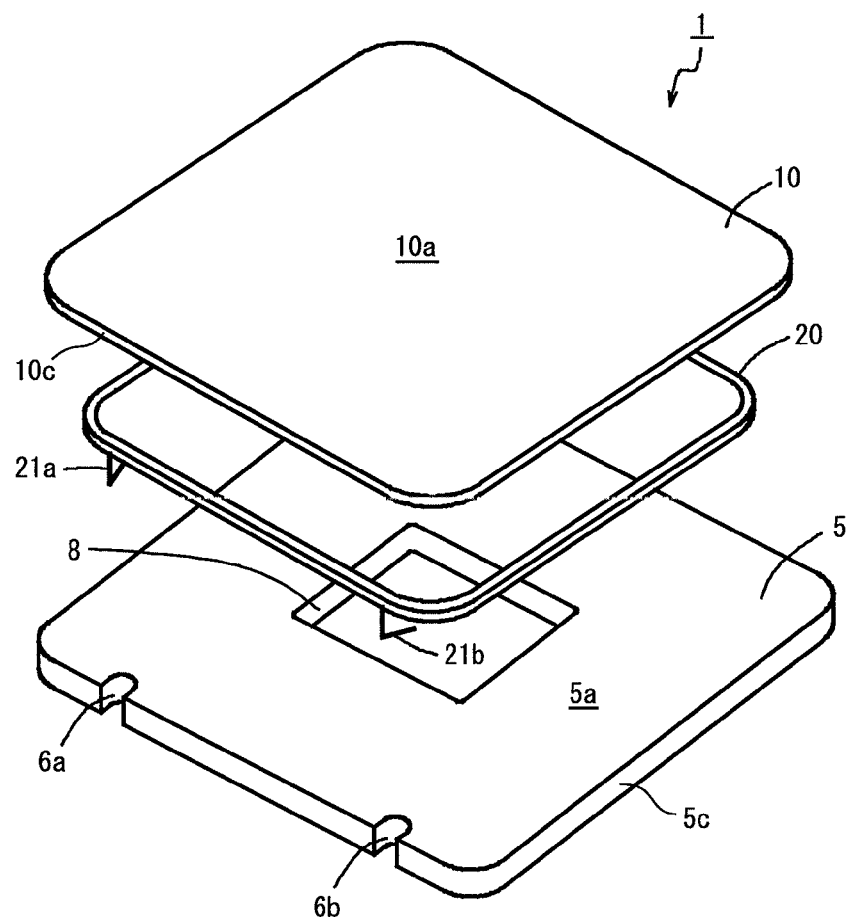
FIG. 4 is an exploded, upper perspective view showing a near-field communication antenna according to the first embodiment of the present invention.
Figure 5:
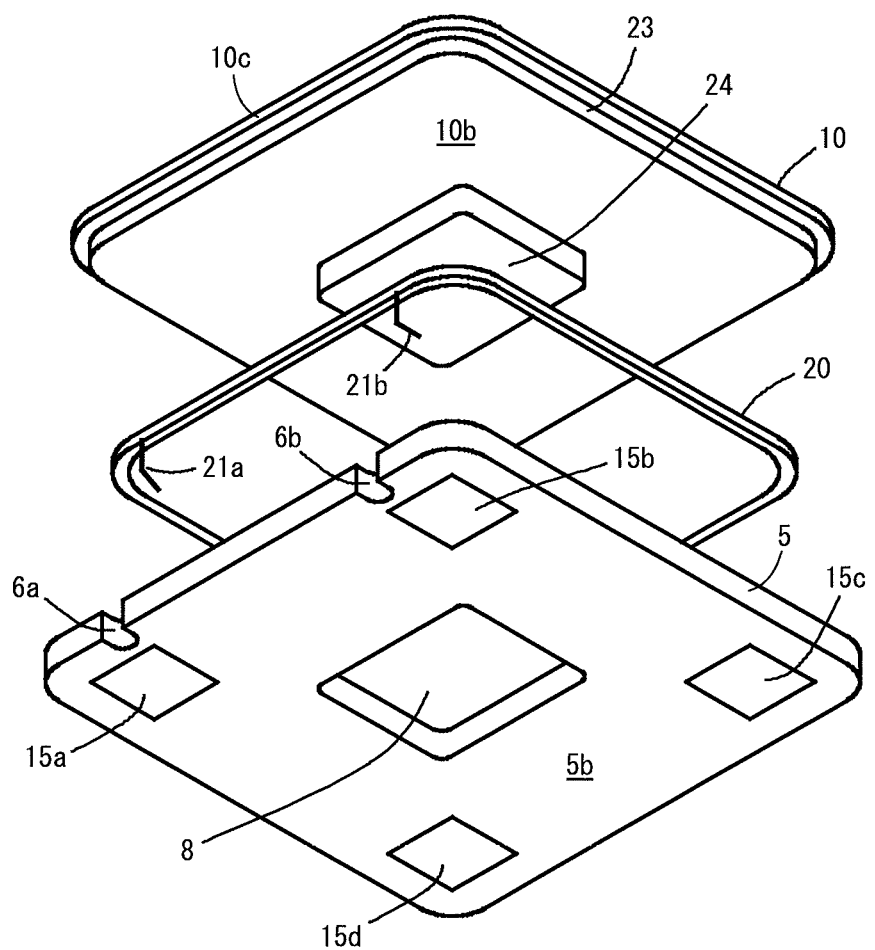
FIG. 5 is an exploded, lower perspective view showing a near-field communication antenna according to the first embodiment of the present invention.

The embodiments of the present invention will be explained in detail below referring to the drawings, without intention of restricting the present invention thereto. Explanations of each embodiment are applicable to other embodiments unless otherwise mentioned. In each figure, a surface facing above is called "upper surface," and a surface facing below is called "bottom surface," but this vertical relation is of course a relative one, reversing the position of an antenna turning this relation opposite. For the simplicity of explanation, corresponding parts of the antenna in every embodiment are provided with the same reference numerals.

[1] First Embodiment

Figure 24:
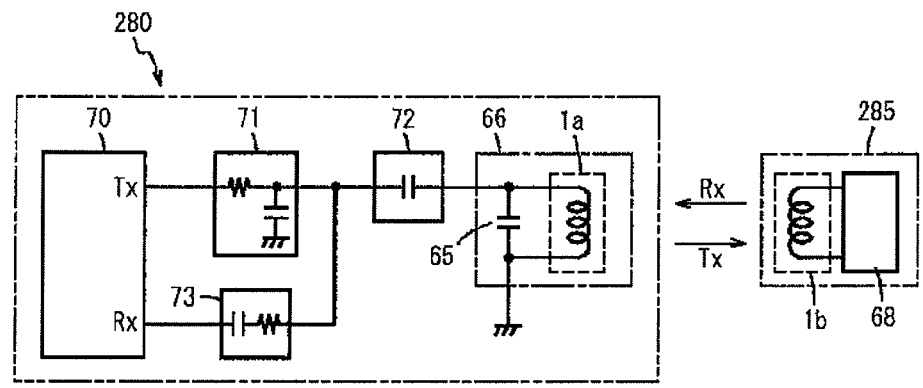
FIG. 24 is a block diagram showing a circuit of an antenna apparatus comprising the near-field communication antenna.
Figure 25:
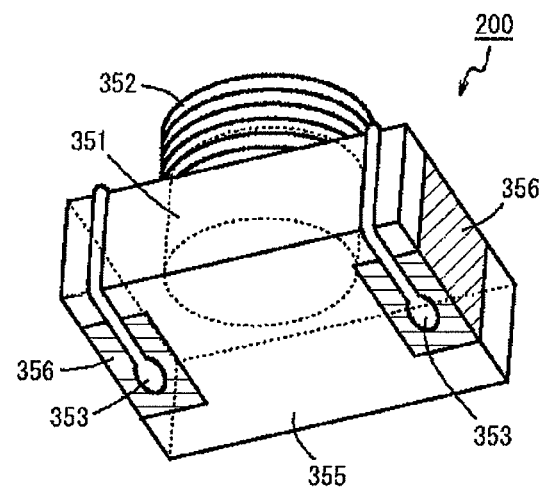
FIG. 25 is a perspective view showing a conventional near-field communication antenna.

FIGS. 1-5 show an antenna 1 according to the first embodiment of the present invention. The antenna 1 comprises an annular coil 20, a non-magnetic resin member 10 holding the annular coil 20, and a rectangular, planar, soft-magnetic member 5 stacked and fixed to the coil-holding, non-magnetic resin member 10 with an adhesive, etc. The soft-magnetic member 5 had a substantially square appearance when viewed from above. The antenna 1 can be used in an unbalanced circuit shown in FIG. 24, or a balanced circuit described later.

The rectangular, planar, soft-magnetic member 5 has a rectangular center opening 8, in which a rectangular center projection 24 of the rectangular, planar, non-magnetic resin member 10 is disposed and fixed by an adhesive, etc. The rectangular, planar, non-magnetic resin member 10 having similarity to the soft-magnetic member 5 has an upper surface 10a, which is a flat free surface, a bottom surface 10b fixed to the soft-magnetic member 5, and a side surface 10c between the upper surface 10a and the bottom surface 10b, the side surface 10c comprising a flange 22 extending from the upper surface 10a and a circumferential step 23. The annular coil 20 is disposed in a gap defined by the circumferential step 23, a lower surface of the flanges 22 and an upper surface 5a of the soft-magnetic member 5.

To make the antenna 1 low in height, the coil-holding, non-magnetic resin member 10 preferably has a thickness of 2 mm or less. The non-magnetic resin member 10 makes easy the automatic mounting of the antenna 1 to a circuit board by sucking, while preventing contact with a sucking nozzle of a mounter and other devices, thereby keeping the annular coil 20 from being damaged. The non-magnetic resin member 10 can be formed by heat-resistant, thermoplastic engineering plastics such as liquid-crystal polymers, polyphenylene sulfide, etc.

The depth of the circumferential step 23 is set such that one or more annular coils 20 wound around the circumferential step 23 do not project from the flange 22 and a periphery of the soft-magnetic member 5. In the depicted example, the non-magnetic resin member 10 has a flat bottom surface 10b with a rectangular projection 24 at a position corresponding to the opening 8 of the soft-magnetic member 5. The shape of the rectangular projection 24 may be properly changed, if necessary.

A conductor wire of the annular coil 20 is wound in plural layers in an axial direction, though it is preferably in a single layer in a radial direction to suppress line capacitance. To suppress the height of the antenna 1, too, the conductor wire is wound preferably in up to two layers. An outer diameter of the annular coil 20 is preferably less than that of the soft-magnetic member 5 (equal to or slightly less than the outer diameter of the soft-magnetic member 5). If the outer surface of the annular coil 20 were outside that of the soft-magnetic member 5, the soft-magnetic member 5 would provide small shielding effects. On the other hand, if the outer surface of the annular coil 20 were largely inside that of the soft-magnetic member 5, there would be too large a magnetic flux density near the annular coil 20, resulting in a short communication distance. A coreless annular coil 20 is disposed near a peripheral edge of the soft-magnetic member 5 to have as large a coreless area as possible, so that the annular coil 20 has more magnetic field distribution on its upper side to secure enough communication distance. From the aspect of balance between communication distance and shielding effects, a gap between a periphery of the annular coil 20 and a periphery of the soft-magnetic member 5 is preferably 0-1 mm. In the annular coil 20, the number of turns can be properly determined depending on the winding diameter of the annular coil 20, the magnetic properties of the soft-magnetic member 5 and desired self-inductance. Though the annular coil 20 has a rectangular outer shape in the depicted example, it may of course be circular.

When the annular coil 20 is separate from the soft-magnetic member 5, the antenna 1 has low self-inductance, and an increased Q value due to a larger distance from a ground surface constituted by a conductor on a circuit board onto which the antenna 1 is mounted. To have the desired self-inductance and Q value, a gap between the annular coil 20 and the soft-magnetic member 5 may be determined. Considering that the gap makes the antenna thicker, the gap is preferably 1 mm or less.

A conductor wire used for the annular coil 20 is preferably a single enameled wire, more preferably an enameled wire having a heat-fusible overcoat (self-fusible wire). The use of the self-fusible annular coil 20 makes assembling easy. The conductor wire preferably has a diameter of 30-80 μm.

The rectangular, soft-magnetic member 5 having a similar shape to the coil-holding, non-magnetic resin member 10 has opposing upper and bottom surfaces 5a, 5b, and a side surface 5c therebetween. In the example shown in FIGS. 1-5, both upper and bottom surfaces 5a, 5b are flat, having a center opening 8 receiving a projection 24 of the non-magnetic resin member 10. To have a small antenna 1, the coil-holding resin member 10 is preferably 30 mm or less in each side, and 2.5 mm or less in thickness. The side surface 5c of the soft-magnetic member 5 is provided with pluralities of notches 6a, 6b for receiving conductor wire leads 21a, 21b extending from both ends of the annular coil 20. Though at least two notches 6a, 6b are enough, each side may have a notch to avoid directionality in the soft-magnetic member 5 regardless of its position.

The soft-magnetic member 5 may be formed by high-resistance, soft-magnetic ferrite such as Ni ferrite, Li ferrite, Mn ferrite, etc.; soft-magnetic Fe—Si alloys, Fe- or Co-based amorphous alloys, or nano-crystalline, soft-magnetic alloys, etc. The soft-magnetic member 5 made of soft-magnetic ferrite is preferably produced by molding calcined powder comprising iron (II) oxide ($Fe_2O_3$), zinc oxide (ZnO), nickel oxide (NiO), copper oxide (CuO), manganese oxide (MnO), etc. as main components, and sintering the resultant molding. The sintered body may be used as it is, though it may be subjected to grinding, punching, etc. The soft-magnetic member 5 made of soft-magnetic ferrite can also be produced by forming a soft-magnetic ferrite slurry into a green sheet by a doctor blade method, etc., working it to a predetermined shape, and sintering it with or without lamination. In this case, too, the sintered body may be worked to a predetermined shape.

The soft-magnetic member 5 formed by an amorphous alloy or a nano-crystalline, soft-magnetic alloy can be produced by cutting an alloy ribbon to a predetermined shape, and laminating the cut ribbons. The alloy ribbon may be pulverized to powder or flake, which is formed into a dust core, or dispersed in a resin or rubber and then formed into a sheet.

In any case, soft-magnetic materials forming the soft-magnetic member 5 preferably have initial permeability μi of 10 or more at a frequency of 100 kHz, when measured in a toroidal core shape.

Though the shape and size of an opening 8 in the soft-magnetic member 5 is not particularly restricted as long as the non-magnetic resin member 10 acting as a magnetic yoke can be positioned, the area of the opening 8 is preferably 1-20%, more preferably 1-10%, based on the area of the soft-magnetic member 5, to secure a function as a magnetic yoke. Each side of the opening 8 is preferably parallel to each corresponding side of the soft-magnetic member 5, and the center of the opening 8 is preferably in agreement with the center of the soft-magnetic member 5. Though the opening 8 is a penetrating hole in the first embodiment, it may be a recess. The projection 24 received in the opening 8 should not project from the bottom surface 5b of the soft-magnetic member 5, on which terminals 15 are provided, lest that the connection of the terminals of the antenna 1 to lines on the mounting board is hindered.

The conductor wires 21a, 21b of the annular coil 20 pass through the periphery notches 6a, 6b of the soft-magnetic member 5, and are connected to terminals 15a, 15b on the bottom surface 5b of the soft-magnetic member 5 by welding, thermal pressing, ultrasonic vibration, etc. The terminals 15a-15d formed by conductor patterns of Ag, etc. are also used as surface-mounting electrodes. Each terminal 15a-15d is constituted by a conductive layer formed on a bottom surface 5b of the soft-magnetic member 5 directly or via an insulating glass or resin layer, and a protective layer formed on a surface of the conductive layer for thermal protection and improved solderability.

The above conductive layer is formed, for example, by printing a paste comprising an alloy of Cu, Ag, Ag—Pd, etc., glass, an organic vehicle, a solvent, etc. to necessary portions of the bottom surface 5b of the soft-magnetic member 5, drying it at about 50-150° C., and firing it at a temperature of 500° C. or higher. In place of firing the alloy paste, the above conductive layer may be formed by plating or vapor-depositing a conductive layer metal, and removing unnecessary conductive layer portions by etching. the above protective layer may be a solder layer, or a plating layer of Ni, Au, etc.

[2] Second Embodiment

Figure 6:
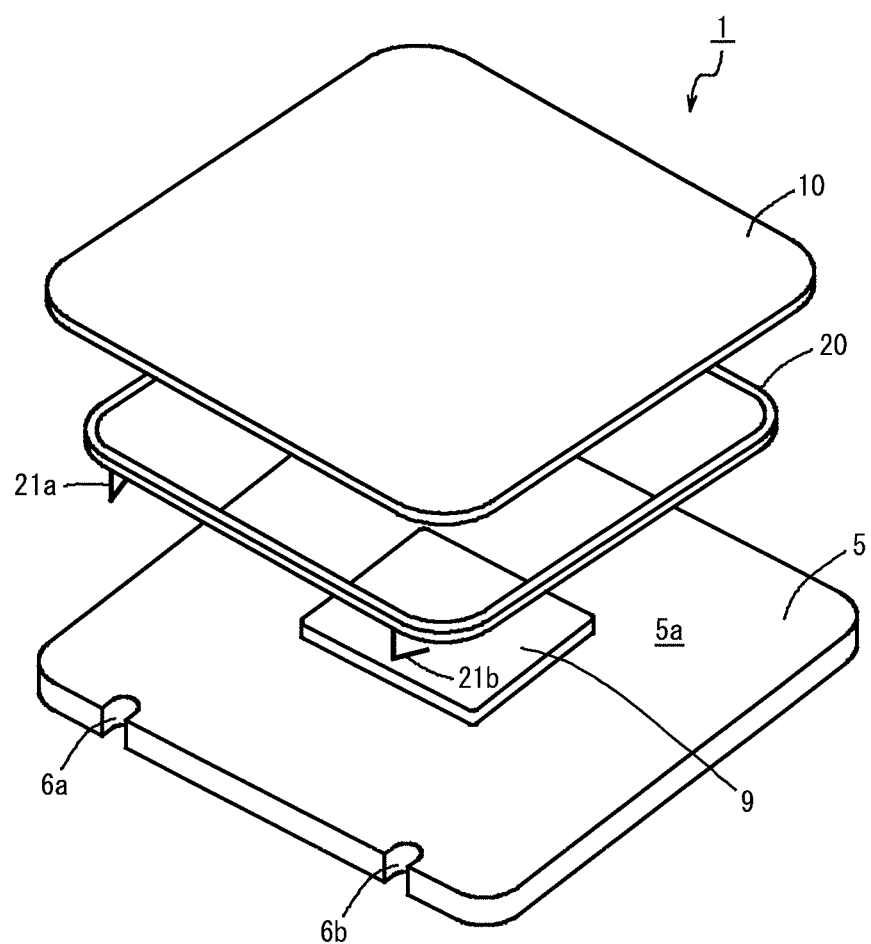
FIG. 6 is an exploded, upper perspective view showing a near-field communication antenna according to the second embodiment of the present invention.
Figure 7:
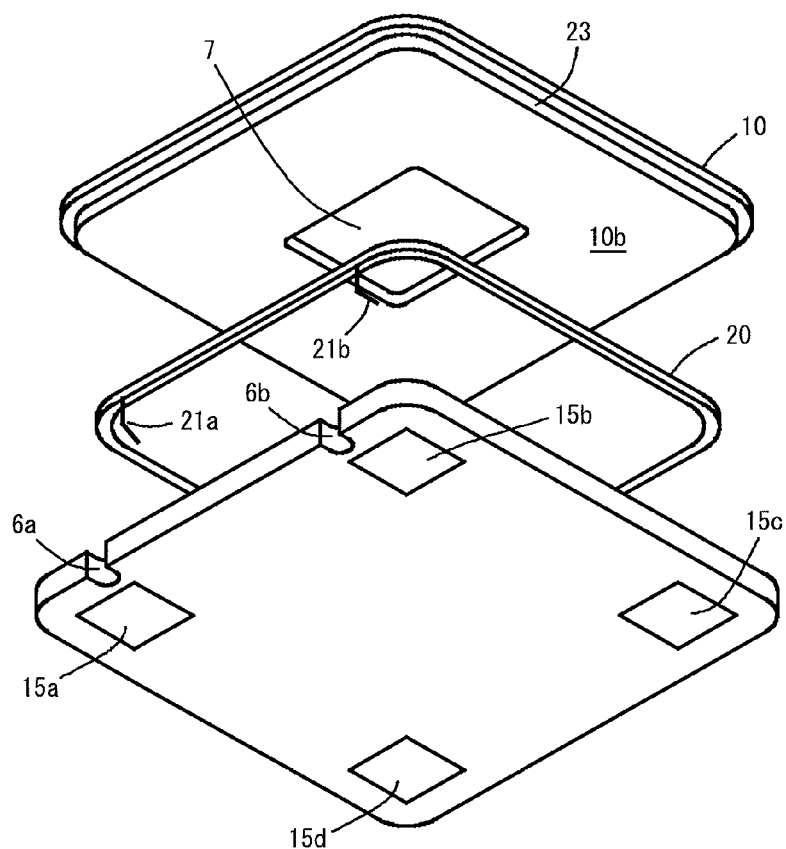
FIG. 7 is an exploded, lower perspective view showing a near-field communication antenna according to the second embodiment of the present invention.

FIGS. 6 and 7 show an antenna according to the second embodiment of the present invention. Because it is substantially the same as the antenna in the first embodiment except for a positioning structure, only differences will be explained in detail. In this embodiment, a positioning center projection 9 is provided on the upper surface 5a of the soft-magnetic member 5, and a recess (unpenetrating recess) 7 for receiving the projection 9 is provided on the bottom surface 10b of the non-magnetic resin member 10. The projection 9 is positioned in a coreless portion of the annular coil 20, and sufficiently smaller than the inner diameter of the annular coil 20. The area of the projection 9 when viewed from above is preferably 1-10%, more preferably 1-5%, based on the inside area of the annular coil 20. It is preferable that each side of the projection 9 is parallel to each side of the soft-magnetic member 5, and that a center of the projection 9 is in agreement with a center of the soft-magnetic member 5. The antenna in the second embodiment with such structure exhibits the same effects as that of the first embodiment.

[3] Third Embodiment

Figure 8:
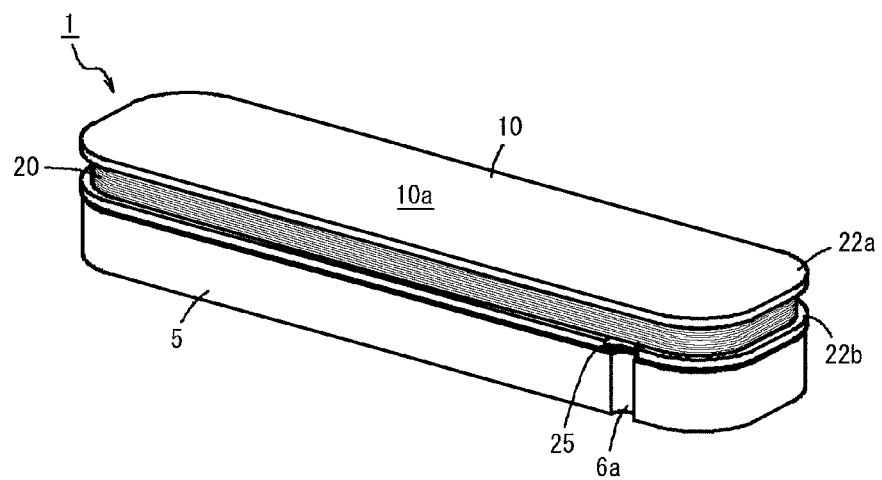
FIG. 8 is an upper perspective view showing a near-field communication antenna according to the third embodiment of the present invention.
Figure 9:
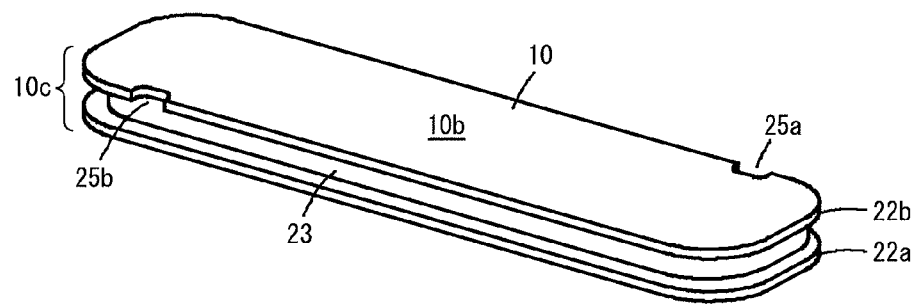
FIG. 9 is a lower perspective view showing a coil-holding, non-magnetic resin member used in a near-field communication antenna according to the third embodiment of the present invention.
Figure 10:
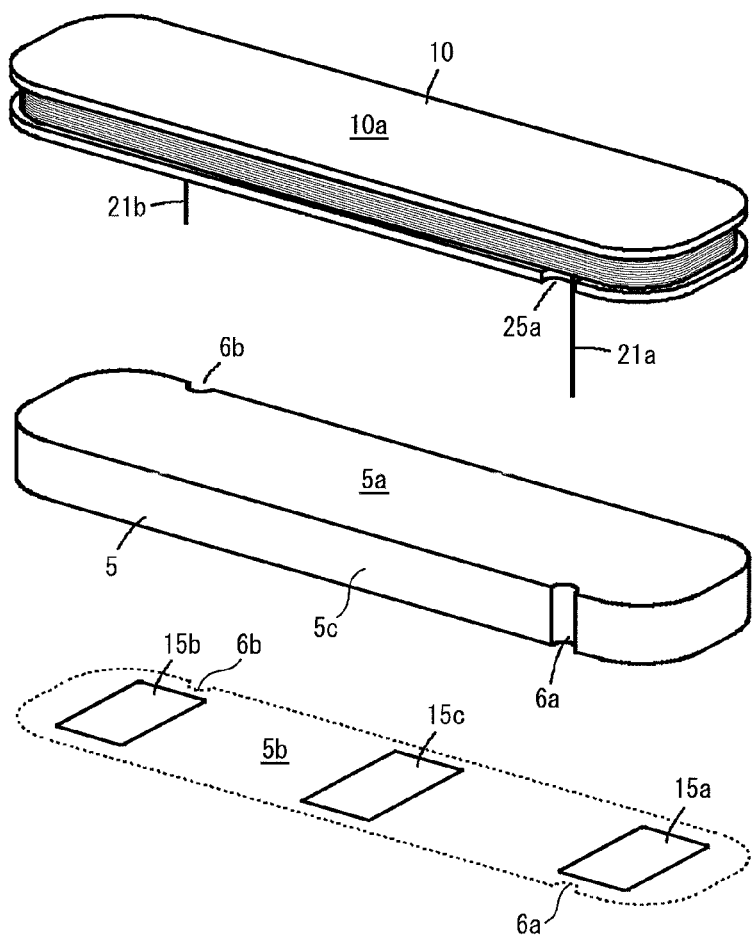
FIG. 10 is an exploded, upper perspective view showing a near-field communication antenna according to the third embodiment of the present invention.

FIGS. 8-10 show an antenna according to the third embodiment of the present invention. This antenna comprises an elongated, coil-holding, non-magnetic resin member 10 shown in FIG. 9, and as elongated a soft-magnetic member 5 as the non-magnetic resin member 10. A bottom surface 10b of the non-magnetic resin member 10 is bonded to an upper surface 5a of the soft-magnetic member 5.

In this embodiment, the non-magnetic resin member 10 comprises a pair of upper and lower flanges 22a, 22b on its entire side surface 10c, and an annular coil 20 wound in a groove 23 between both flanges 22a, 22b. The flange 22b on the side of the bottom surface 10b is provided with notches 25a, 25b, through which conductor wire leads of the annular coil 20 pass.

The soft-magnetic member 5 is also provided on its side surface 5c with notches 6a, 6b at positions corresponding to those of the notches 25a, 25b of the non-magnetic resin member 10. A bottom surface of the soft-magnetic member 5 is provided with three terminals 15a, 15b, 15c, the terminal 15a being close to the notch 6a, the terminal 15b being close to the notch 6b, and the terminal 15c being at an immediate position between the terminals 15a and 15b. The terminal 15c is used as a surface-mounting electrode.

One conductor wire lead 21a of the annular coil 20 is connected to the terminal 15a through the notch 25a of the non-magnetic resin member 10 and the notch 6a of the soft-magnetic member 5, and the other conductor wire lead 21b of the annular coil 20 is connected to the terminal 15b through the notch 25b of the non-magnetic resin member 10 and the notch 6b of the soft-magnetic member 5.

Because the annular coil 20 is wound in the groove 23 between a pair of flanges 22a, 22b in this embodiment, the annular coil 20 can be easily positioned. The annular coil 20 is separate from the soft-magnetic member 5 by the thickness of the flange 22b. Though the soft-magnetic member 5 and the coil-holding resin member 10 have no positioning means (combinations of projections and openings), the notches 25a, 25b of the non-magnetic resin member 10 can be matched with the notches 6a, 6b of the soft-magnetic member 5 for the purpose of positioning the non-magnetic resin member 10 and the soft-magnetic member 5.

Because this antenna is elongated, it can be mounted along an edge of a circuit board to secure a mounting region of other devices. The antenna in the third embodiment exhibits the same effects as those of the antenna in the first embodiment.

[4] Fourth Embodiment

Figure 11:
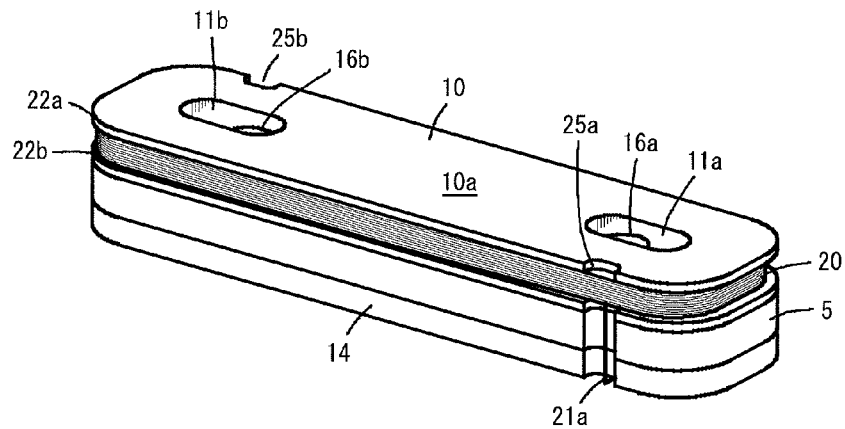
FIG. 11 is an upper perspective view showing a near-field communication antenna according to the fourth embodiment of the present invention.
Figure 12:
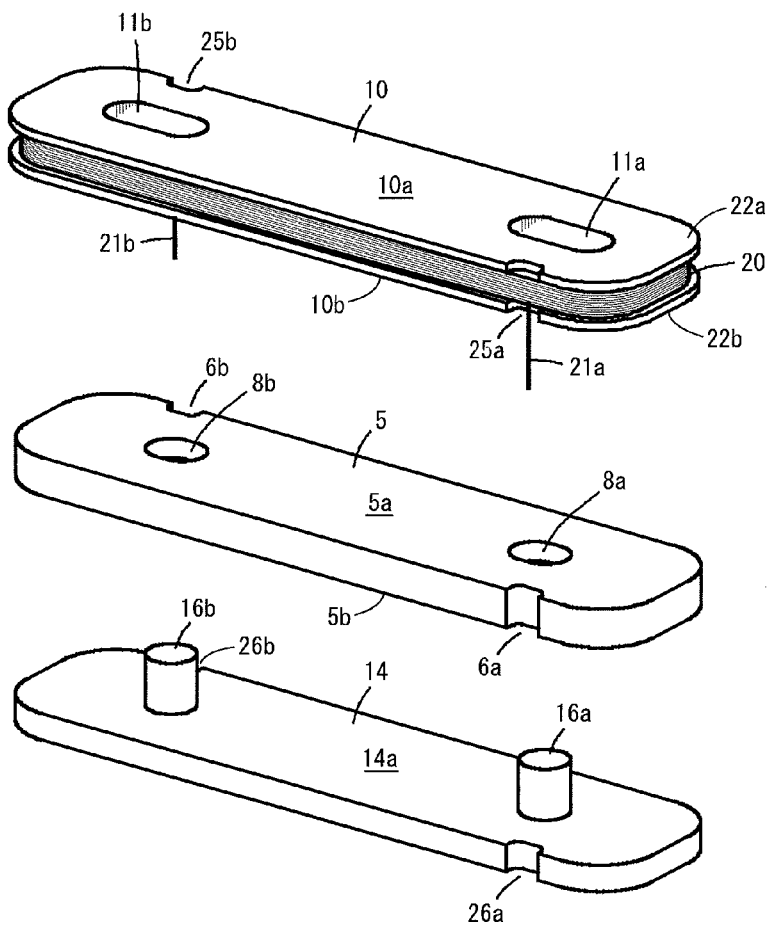
FIG. 12 is an exploded, upper perspective view showing a near-field communication antenna according to the fourth embodiment of the present invention.

FIGS. 11 and 12 show an antenna according to the fourth embodiment of the present invention. This antenna comprises a substrate member 14 comprising a pair of projections 16a, 16b, a soft-magnetic member 5 having a pair of openings 8a, 8b for receiving the projections 16a, 16b, and a coil-holding, non-magnetic resin member 10 having a pair of openings 11a, 11b for receiving the projections 16a, 16b, the non-magnetic resin member 10 having a peripheral flange 22a on the upper surface side and a peripheral flange 22b on the bottom surface side, and an annular coil 20 being wound in a groove defined by a pair of flanges 22a, 22b. The non-magnetic resin member 10 has notches 25a, 25b on the opposing side surfaces, the soft-magnetic member 5 has notches 6a, 6b on the opposing side surfaces at the same position as the notches 25a, 25b when viewed from above, and the substrate member 14 has notches 26a, 26b on the opposing side surfaces at the same position as the notches 25a, 25b when viewed from above.

The non-magnetic resin member 10, the soft-magnetic member 5 and the substrate member 14 are laminated in this order, with the projections 16a, 16b of the substrate member 14 inserted into the opening 11as, 11b of the non-magnetic resin member 10 and the openings 8a, 8b of the soft-magnetic member 5, with the upper surface 5a of the soft-magnetic member 5 bonded to the bottom surface 10b of the non-magnetic resin member 10, and with the upper surface 14a of the substrate member 14 bonded to the bottom surface 5b of the soft-magnetic member 5. The length of the projections 16a, 16b is determined, such that when the non-magnetic resin member 10, the soft-magnetic member 5 and the substrate member 14 are overlapped, the projections 16a, 16b do not extend from the openings 11a, 11b. The notches 25a, 25b of the non-magnetic resin member 10, the notches 6a, 6b of the soft-magnetic member 5, and the notches 26a, 26b of the substrate member 14 are vertically aligned, constituting a pair of perpendicular notches, through which both lead wires 21a, 21b of the annular coil 20 pass.

The antenna in the fourth embodiment also exhibits the same effects as those of the antenna in the first embodiment. In addition, positioning is very easy in this antenna, when assembling the non-magnetic resin member 10, the soft-magnetic member 5 and the substrate member 14. The substrate member 14 is preferably formed by a liquid-crystal polymer.

[5] Fifth Embodiment

Figure 13:
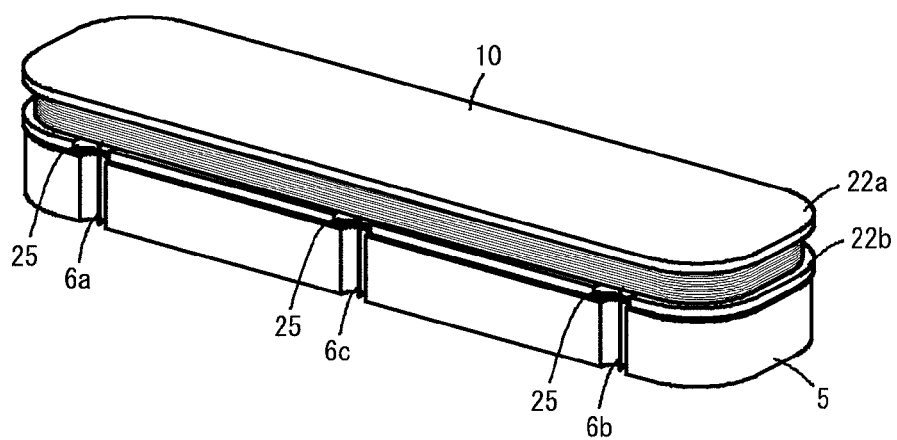
FIG. 13 is an upper perspective view showing a near-field communication antenna according to the fifth embodiment of the present invention.
Figure 14:
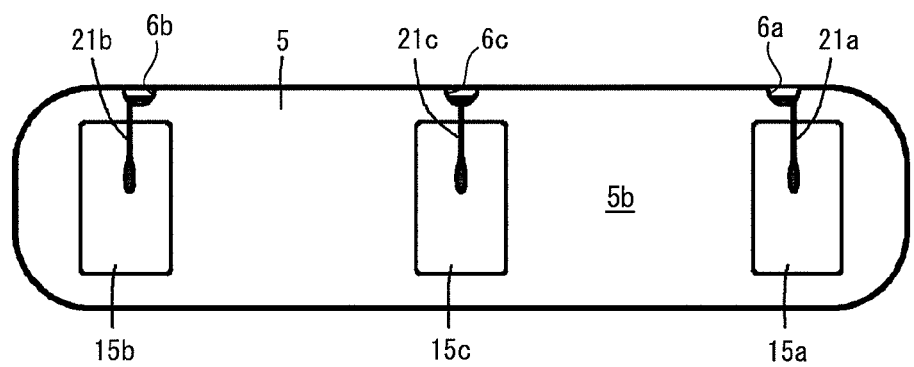
FIG. 14 is a bottom view showing a near-field communication antenna according to the fifth embodiment of the present invention.
Figure 15:
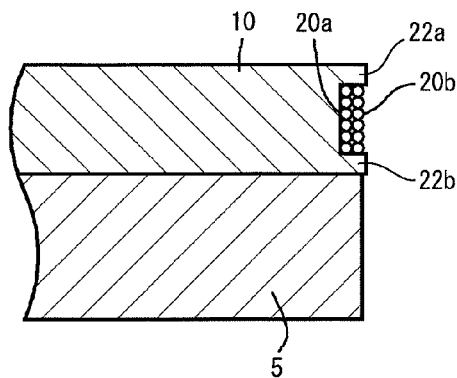
FIG. 15 is a partial, enlarged cross-sectional view showing a near-field communication antenna according to the fifth embodiment of the present invention.

FIGS. 13-15 show an antenna according to the fifth embodiment of the present invention. In this embodiment, the annular coil 20 is constituted by first and second coils 20*a*, 20*b* concentrically wound in a groove between flanges 22*a*, 22*b* of the coil-holding, non-magnetic resin member 10. The bottom surface 5*b* of the soft-magnetic member 5 is provided with three terminals 15*a*, 15*b*, 15*c*. One conductor wire lead of the first coil 20*a* and one conductor wire lead of the second coil 20*b* are connected to a common line 21*c*, which is connected to a center terminal 15*c*, and the other conductor wire leads 21*a*, 21*b* of both coils 20*a*, 20*b* are connected to terminals 15*a*, 15*b* at both ends. The first coil 20*a* and the second coil 20*b* are wound in an opposite direction when viewed from the common line 21*c*.

Figure 16:
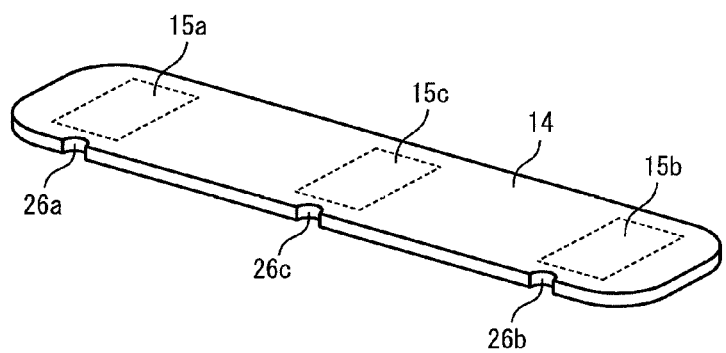
FIG. 16 is an upper perspective view showing a substrate member usable in a near-field communication antenna according to the fifth embodiment of the present invention.

Instead of forming terminals on the bottom surface 5*b* of the soft-magnetic member 5, a flexible or rigid substrate (for example, glass-reinforced epoxy substrate), on which conductor patterns for terminals are printed, or a resin substrate 14, in which terminals 15*a*, 15*b*, 15*c* are integrally insert-molded as shown in FIG. 16, may be used. The substrate 14 is provided on one side surface with notches 26*a*, 26*b*, 26*c* for permitting conductor wire leads 21*a*, 21*b*, 21*c* to pass through, at positions corresponding to those of the notches 6*a*, 6*b*, 6*c* of the soft-magnetic member 5.

Figure 17:
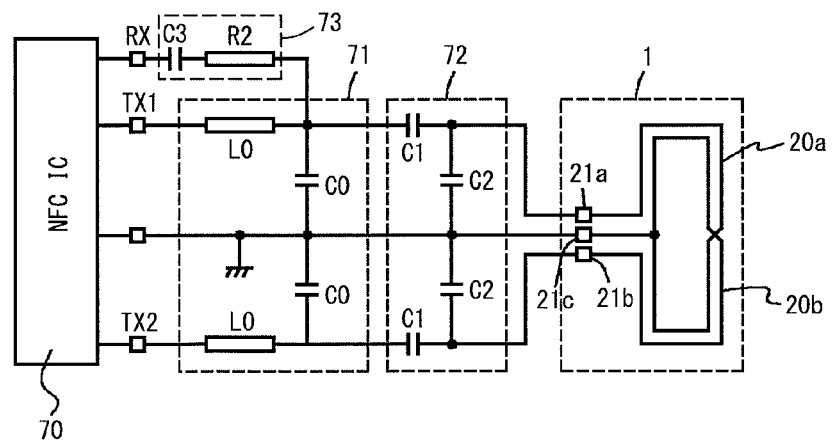
FIG. 17 is a block diagram showing an example of a circuit structure of a module comprising the near-field communication antenna of the present invention.

FIG. 17 shows a balanced circuit of the module of the present invention comprising this antenna. One end 21*a* of the first coil 20*a* is connected to a matching circuit 72 constituted by capacitors C1, C2, and then connected to an output terminal Tx1, which is connected to a modulation circuit of a transmission circuit in a semiconductor 70, via a first filter 71 constituted by an inductor L0 and a capacitor C0. An input terminal Rx connected to a demodulation circuit of a reception circuit in the semiconductor 70 is connected to a connecting point of the filter 71 and the matching circuit 72, via a second filter 73 comprising a resistor R2 and a capacitor C3 connected in series. Similarly, one end 21*b* of the second coil 20*b* is connected to a matching circuit 72 constituted by capacitors C1, C2, and then connected to an output terminal Tx2, which is connected to the modulation circuit of the transmission circuit in the semiconductor 70, via the first filter 71 constituted by the inductor L0 and the capacitor C0. A common terminal 21*c* of the first coil 20*a* and the second coil 20*b* is grounded. The antenna 1, the semiconductor 70, the matching circuit 72, and reactance elements and resistance elements constituting the first and second filters 71, 73 are mounted onto a glass-reinforced epoxy substrate, to provide a module. As in the first to fifth embodiments, a balanced circuit module can be obtained without an intermediate tap, by connecting one end of the annular coil 20 to the output terminal Tx, and connecting the other end of the annular coil 20 to the output terminal Tx2.

[6] Sixth Embodiment

Figure 18:
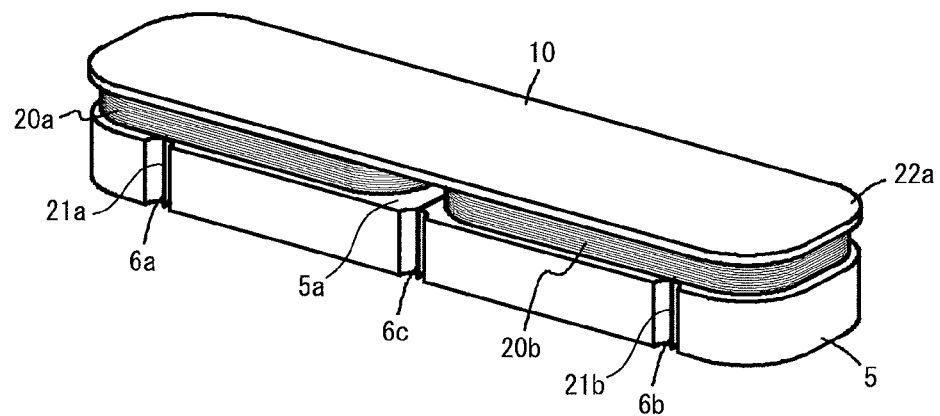
FIG. 18 is an upper perspective view showing a near-field communication antenna according to the sixth embodiment of the present invention.

FIG. 18 shows an antenna according to the sixth embodiment of the present invention. This antenna is the same as in the fifth embodiment in that the annular coil 20 is constituted by first and second coils 20*a*, 20*b*, but differs in that two coils 20*a*, 20*b* are arranged in parallel on an upper surface 5*a* of the soft-magnetic member 5. One conductor wire lead of the first coil 20*a* and one conductor wire lead of the second coil 20*b* are connected to a common line 21*c*, which is connected to the terminal 15*c*, and the conductor wire leads 21*a*, 21*b* of the coils 20*a*, 20*b* are connected to the terminals 15*a*, 15*b*. The first coil 20*a* and the second coil 20*b* are wound in an opposite direction when viewed from the common line 21*c*.

Figure 19:
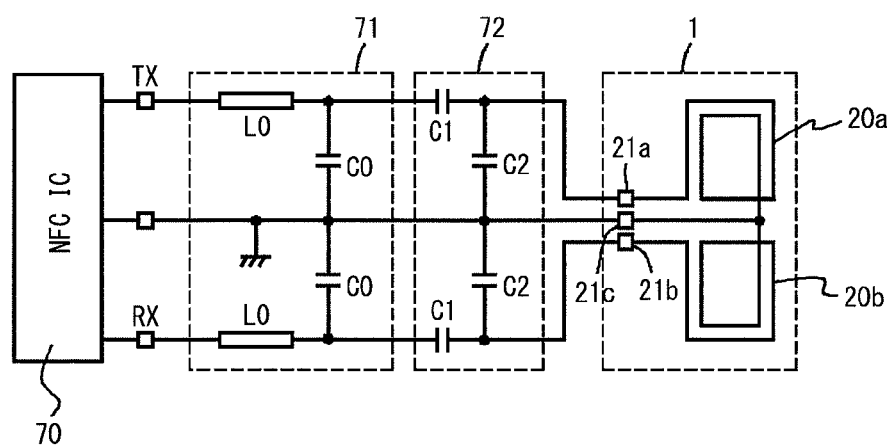
FIG. 19 is a block diagram showing an example of a circuit structure of a module comprising the near-field communication antenna of the present invention.

FIG. 19 shows another circuit structure of the module of the present invention comprising this antenna. One end 21*a* of the first coil 20*a* is connected to an output terminal Tx, which is connected to a modulation circuit of a transmission circuit in a semiconductor 70, via a matching circuit 72 and a filter 71. One end 21*b* of the second coil 20*b* is connected to an input terminal Rx connected to a demodulation circuit of a reception circuit in the semiconductor 70, via the matching circuit 72 and the filter 71. The antenna 1, the semiconductor 70, the matching circuit 72, and reactance elements and resistance elements constituting the filter 71 are mounted onto a glass-reinforced epoxy substrate, to provide a module. The module having such structure can receive signals while transmitting signals.

Figure 27:
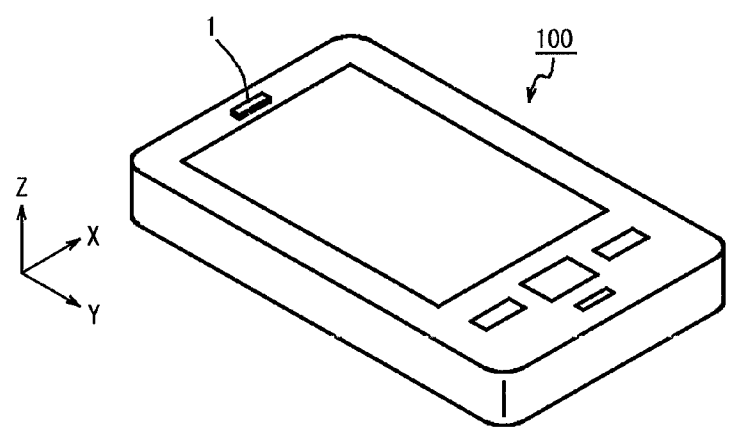
FIG. 27 is a perspective view showing an appearance of a wireless communications apparatus comprising the near-field communication antenna of the present invention.

FIG. 27 shows the appearance of a wireless communications apparatus comprising the antenna of the present invention. Because the antennas of the present invention are small, they may be contained in small communication apparatuses with little electric power consumption and high function, such as smartphones 100.

The present invention will be explained in further detail by Examples below, without intention of restricting the present invention thereto.

Examples 1-3

Figure 20A:
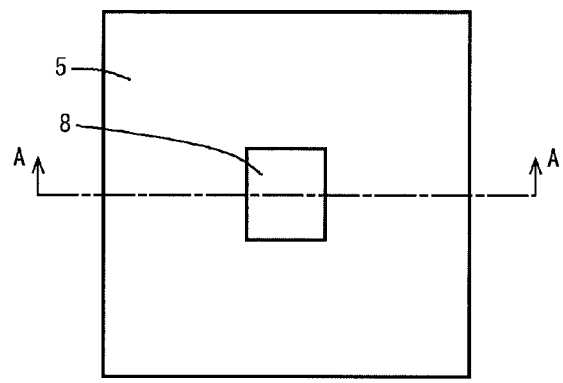
FIG. 20(a) is a plan view showing a soft-magnetic member of Samples 1-3 used in the near-field communication antennas of Examples 1-3.
Figure 20B:
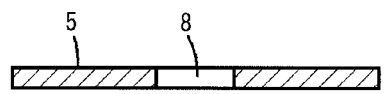
FIG. 20(b) is a cross-sectional view taken along the line A-A in FIG. 20(a).

Used as a soft-magnetic material forming the soft-magnetic member 5 was Ni ferrite having a composition (after sintering) of 46.5% by mol of $Fe_2O_3$, 20.0% by mol of ZnO, 22.5% by mol of NiO, and 11.0% by mol of CuO, and an initial permeability of 110. $Fe_2O_3$ powder, ZnO powder, NiO powder and CuO powder were mixed to have the above composition after sintering, and calcined. The calcined powder was mixed with a binder, etc. and granulated, and the resultant granule powder was molded to square green bodies, sintered at 1100° C. The resultant sintered bodies were each provided with a center opening 8, and their necessary surfaces were made flat by grinding to produce square soft-magnetic members 5 (Samples 1-3) each having a center opening 8 as shown in FIGS. 20(*a*) and 20(*b*). Any of Samples 1-3 had an outer size (after sintering) of 14 mm×14 mm×0.8 mm, the size of the center opening 8 being 3.5 mm×3 mm (Sample 1), 2.5 mm×2 mm (Sample 2), and 1.5 mm×1 mm (Sample 3), respectively.

A non-magnetic resin member 10 having a projection corresponding to each of Samples 1-3 was formed by a liquid-crystal polymer. Each non-magnetic resin member 10 had an outer size of 13.6 mm×13.6 mm×0.6 mm except for the projection. Each non-magnetic resin member 10 was provided with an annular notch 0.3 mm from a peripheral edge and 0.3 mm from a main surface in its entire side surface. 7 turns of an enameled wire of 60 μm in diameter (conductor diameter: 50 μm, coating layer thickness: 5 μm) was wound around this annular notch, to provide an annular coil 20 of 13 mm in side and 0.25 mm in thickness. The annular coil 20 and the non-magnetic resin member 10 were bonded to the soft-magnetic member 5 to produce a 1.4-mm-thick antenna.

Example 4

Figure 21A:
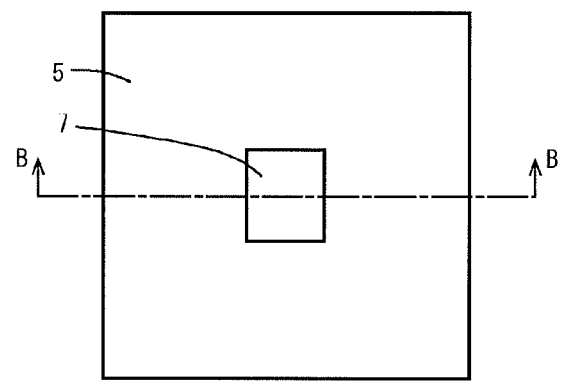
FIG. 21(a) is a plan view showing a soft-magnetic member of Sample 4 used in the near-field communication antenna of Example 4.
Figure 21B:
FIG. 21(b) is a cross-sectional view taken along the line B-B in FIG. 21(a).

A square, soft-magnetic member 5 (Sample 4) having a center recess 8 as shown in FIGS. 21(*a*) and 21(*b*) was produced in the same manner as in Examples 1-3. Sample 4 had an outer size of 14 mm×14 mm×0.8 mm, with a center recess 7 of 3.5 mm×3 mm in side and 0.4 mm in depth. Using the soft-magnetic member 5 of Sample 4, a 1.4-mm-thick antenna was produced in the same manner as in Examples 1-3.

Example 5

Figure 22A:
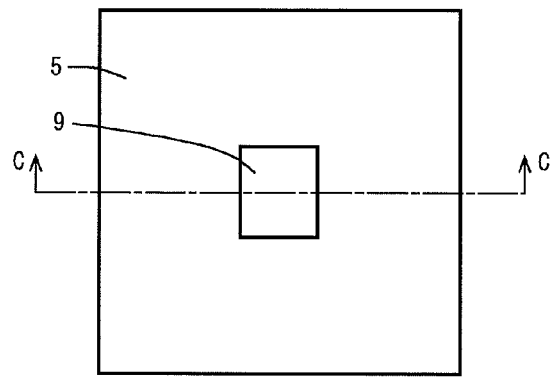
FIG. 22(a) is a plan view showing a soft-magnetic member of Sample 5 used in the near-field communication antenna of Example 5.
Figure 22B:
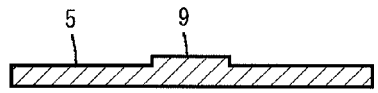
FIG. 22(b) is a cross-sectional view taken along the line C-C in FIG. 22(a).

A square soft-magnetic member 5 (Sample 5) having a center projection 9 as shown in FIGS. 22(a) and 22(b) was produced in the same manner as in Examples 1-3. Sample 5 had an outer size of 14 mm×14 mm×0.8 mm, and the center projection 9 had a size of 3.5 mm×3 mm with a height of 0.4 mm. Using the soft-magnetic member 5 of Sample 5, an antenna as thick as 1.4 mm was produced in the same manner as in Examples 1-3. An area ratio of the center projection 9 to the inside portion of the annular coil 20 was 6.2%.

Comparative Example 1

Figure 23A:
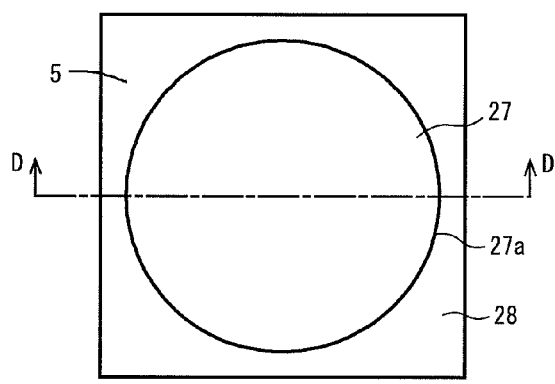
FIG. 23(a) is a plan view showing a soft-magnetic member of Sample 6 used in the near-field communication antenna of Comparative Example 1.
Figure 23B:
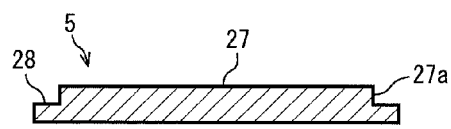
FIG. 23(b) is a cross-sectional view taken along the line D-D in FIG. 23(a).

A square soft-magnetic member 5 (Sample 6) having a circular body 27 as shown in FIGS. 23(a) and 23(b) was produced in the same manner as in Examples 1-3. Sample 6 had an outer size of 14 mm×14 mm×0.7 mm, and the circular body 27 had a diameter of 12 mm and a height of 0.7 mm. An area ratio of the circular body 27 to an inside portion of the annular coil 20 was 100%.

An enameled wire having a diameter of 60 μm (conductor diameter: 50 μm, coating layer thickness: 5 μm) was wound 6 turns around the circular body 27 for the soft-magnetic member 5 of Sample 6, to form an annular coil 20 having an inner diameter of 12 mm, an outer diameter of 12.7 mm and a thickness of 0.1 mm. The annular coil 20 was bonded to the soft-magnetic member 5 to produce an antenna of 1.4 mm in thickness.

Figure 26:
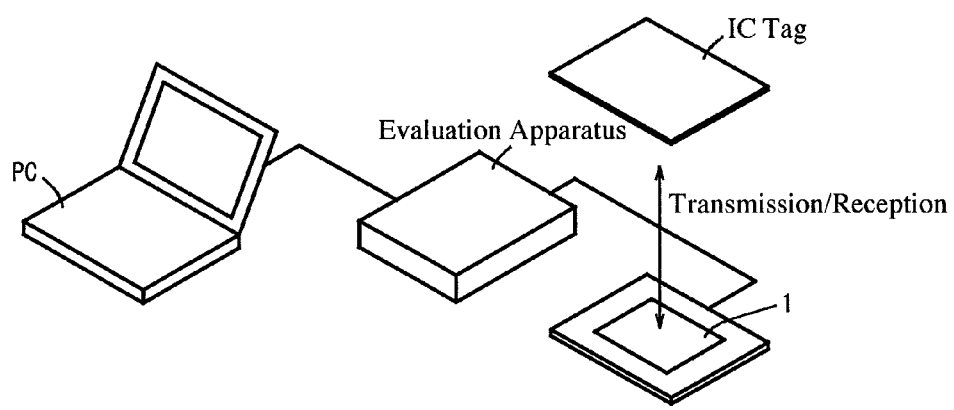
FIG. 26 is a schematic view showing a method for evaluating the communication distance of an antenna.

Using the evaluation apparatus shown in FIG. 26, communication was conducted between each antenna and an IC tag. The evaluation apparatus was an evaluation board available from NXP Semiconductor comprising a signal-processing circuit necessary for non-contact data communications, and an information-storing IC chip. In order that the antenna has a self-resonance frequency of 40 MHz or more, the self-inductance of the antenna at 13.56 MHz is desirably less than 3 μl.

With respect to the antennas of Examples 1-5 and Comparative Example 1, the number of turns of a coil was adjusted to have self-inductance of less than 3 pH. In Examples 1-5 and Comparative Example 1, the matching circuits had the same constant. The communication distance between the antenna and the IC tag is shown in Table 1.

TABLE 1

| No. | Soft-Magnetic Member | Self-Inductance (μH) | Communication Distance (mm) |
|---|---|---|---|
| Example 1 | Sample 1 | 2.89 | 36 |
| Example 2 | Sample 2 | 2.91 | 36 |
| Example 3 | Sample 3 | 2.92 | 36 |
| Example 4 | Sample 4 | 2.84 | 36 |
| Example 5 | Sample 5 | 2.95 | 36 |
| Com. Ex. 1 | Sample 6 | 2.65 | 31 |

In the antennas of Examples 1-3, self-inductance at 13.56 MHz decreased slightly as the opening area of the soft-magnetic member 5 increased. The antenna of Example 4 having a recess in the soft-magnetic member 5 had low self-inductance. The antenna of Example 5 having a projection in the soft-magnetic member 5 had slightly increased self-inductance. Thus, inductance of less than 3 μH was obtained with the same number of winding in any of Examples 1-5. In Examples 4 and 5, the same communication distance was obtained with the same matching circuit, despite the maximum inductance difference of 0.11 μH. Because the opening, recess or projection provided in a center portion of the soft-magnetic member 5 had little influence on magnetic flux contributing to communications, there was no difference in communication distance among Examples 1-5.

In the antenna of Comparative Example 1, self-inductance was as large as 3.73 μH with the same number of turns of a coil as in Example 1, failing to obtain inductance of less than 3 μH. Though inductance of less than 3 μH was obtained by reducing the number of turns of a coil to 6, communications were not achieved by the same matching circuit as in Examples, and impedance matching adjustment with a matching circuit constant changed merely provided as short communication distance as 31 mm.

EFFECTS OF THE INVENTION

The near-field communication antenna of the present invention can be made small, with secured directionality and communication distance to a communication mate, as well as easy coil protection and easy surface mounting.

What is claimed is:

1. A near-field communication antenna comprising at least one annular coil, a planar, non-magnetic resin member holding said annular coil, a planar, soft-magnetic member overlapping said non-magnetic resin member via said annular coil, and terminals connected to conductor wire leads of said annular coil;
   said annular coil being disposed in a circumferential recess along a periphery of said non-magnetic resin member, lest that said annular coil projects from the periphery of said soft-magnetic member and that said soft-magnetic member is disposed in an outside region of said annular coil;
   an entire inside of said annular coil is a non-magnetic region, or an almost entire inside of said annular coil is a non-magnetic region filled with said soft-magnetic member; and
   conductor wire leads of said annular coil being connected to said terminals through notches formed in a peripheral edge of said soft-magnetic member.

2. The near-field communication antenna according to claim 1, wherein the entire inside of said annular coil is a non-magnetic region,
   wherein said non-magnetic resin member has a projection, and
   wherein said soft-magnetic member has a recess for receiving the projection.

3. The near-field communication antenna according to claim 1, wherein said non-magnetic resin member has a fixed surface in contact with said soft-magnetic member, and a free surface opposing it; wherein the circumferential recess of said non-magnetic resin member is constituted by a circumferential step having a peripheral flange extending from said free surface; and wherein said annular coil is received in a gap defined by said soft-magnetic member bonded to said non-magnetic resin member and said peripheral flange.

4. The near-field communication antenna according to claim 1, wherein said non-magnetic resin member has a fixed surface bonded to said soft-magnetic member, and a free surface opposing it; wherein the circumferential recess of said non-magnetic resin member is a circumferential groove defined by a pair of peripheral flanges extending from said fixed surface and said free surface: and wherein said annular coil is received in said circumferential groove.

5. A near-field communication antenna comprising at least one annular coil, a planar, non-magnetic resin member holding said annular coil, a planar, soft-magnetic member overlapping said non-magnetic resin member via said annular coil, and terminals connected to conductor wire leads of said annular coil;
- said annular coil being disposed in a circumferential recess along a periphery of said non-magnetic resin member, lest that said annular coil projects from the periphery of said soft-magnetic member; and
- conductor wire leads of said annular coil being connected to said terminals through notches formed in a peripheral edge of said soft-magnetic member;
- said annular coil being constituted by first and second coils concentrically arranged;
- one end of a conductor wire of each of said first and second coils being connected to a ground terminal, and the other end of a conductor wire of each of said first and second coils being connected to a signal terminal; and
- said first and second coils being wound in an opposite direction when viewed from said ground terminal.

6. A near-field communication antenna comprising at least one annular coil, a planar, non-magnetic resin member holding said annular coil, a planar, soft-magnetic member overlapping said non-magnetic resin member via said annular coil, and terminals connected to conductor wire leads of said annular coil;
- said annular coil being disposed in a circumferential non-magnetic resin member, lest that said annular coil projects from the periphery of said soft-magnetic member; and
- conductor wire leads of said annular coil being connected to said terminals through notches formed in a peripheral edge of said soft-magnetic member;
- said annular coil being constituted by the first and second coils arranged on a surface of said soft-magnetic member;
- one end of a conductor wire of each of said first and second coils being connected to a ground terminal, and the other end of a conductor wire of each of said first and second coils being connected to a signal terminal; and
- said first and second coils being wound in an opposite direction when viewed from said ground terminal.

7. The near-field communication antenna according to claim 1,
- said non-magnetic resin member comprising a projection;
- said soft-magnetic member having an opening or recess receiving said projection of said non-magnetic resin member; and
- said non-magnetic resin member being positioned to said soft-magnetic member, with said projection inserted into said opening or recess.

8. The near-field communication antenna according to claim 1,
- said soft-magnetic member comprising a projection;
- said non-magnetic resin member having an opening or recess receiving said projection of said soft-magnetic member; and
- said soft-magnetic member being positioned to said non-magnetic resin member, with said projection inserted into said opening or recess.

9. The near-field communication antenna according to claim 1, further comprising a substrate member comprising terminals; said substrate member being bonded to a surface of said soft-magnetic member on the opposite side of said annular coil.

10. The near-field communication antenna according to claim 9, wherein said substrate member comprises at least one projection; wherein said soft-magnetic member has at least one opening receiving the projection of said substrate member; and wherein said non-magnetic resin member has at least one opening or recess receiving the projection of said substrate member.

11. A module comprising the near-field communication antenna recited in claim 1, wherein said near-field communication antenna, reactance elements constituting a matching circuit, reactance elements constituting a noise filter, and an integrated circuit constituting a transmission circuit and a reception circuit are mounted onto a resin substrate.

12. A wireless communications apparatus comprising the near-field communication antenna recited in claim 1.

13. The near-field communication antenna according to claim 5,
- said non-magnetic resin member comprising a projection;
- said soft-magnetic member having an opening or recess receiving said projection of said non-magnetic resin member; and
- said non-magnetic resin member being positioned to said soft-magnetic member, with said projection inserted into said opening or recess.

14. The near-field communication antenna according to claim 5,
- said soft-magnetic member comprising a projection;
- said non-magnetic resin member having an opening or recess receiving said projection of said soft-magnetic member; and
- said soft-magnetic member being positioned to said non-magnetic resin member, with said projection inserted into said opening or recess.

15. The near-field communication antenna according to claim 5, further comprising a substrate member comprising terminals; said substrate member being bonded to a surface of said soft-magnetic member on the opposite side of said annular coil.

16. The near-field communication antenna according to claim 15, wherein said substrate member comprises at least one projection; wherein said soft-magnetic member has at least one opening receiving the projection of said substrate member; and wherein said non-magnetic resin member has at least one opening or recess receiving the projection of said substrate member.

17. A module comprising the near-field communication antenna recited in claim 5, wherein said near-field communication antenna, reactance elements constituting a matching circuit, reactance elements constituting a noise filter, and an integrated circuit constituting a transmission circuit and a reception circuit are mounted onto a resin substrate.

18. A wireless communications apparatus comprising the near-field communication antenna recited in claim 5.

19. The near-field communication antenna according to claim 6,
- said non-magnetic resin member comprising a projection;
- said soft-magnetic member having an opening or recess receiving said projection of said non-magnetic resin member; and
- said non-magnetic resin member being positioned to said soft-magnetic member, with said projection inserted into said opening or recess.

20. The near-field communication antenna according to claim 6, said soft-magnetic member comprising a projection;
said non-magnetic resin member having an opening or recess receiving said projection of said soft-magnetic member; and
said soft-magnetic member being positioned to said non-magnetic resin member, with said projection inserted into said opening or recess.

21. The near-field communication antenna according to claim 6, further comprising a substrate member comprising terminals; said substrate member being bonded to a surface of said soft-magnetic member on the opposite side of said annular coil.

22. The near-field communication antenna according to claim 21, wherein said substrate member comprises at least one projection; wherein said soft-magnetic member has at least one opening receiving the projection of said substrate member; and wherein said non-magnetic resin member has at least one opening or recess receiving the projection of said substrate member.

23. A module comprising the near-field communication antenna recited in claim 6, wherein said near-field communication antenna, reactance elements constituting a matching circuit, reactance elements constituting a noise filter, and an integrated circuit constituting a transmission circuit and a reception circuit are mounted onto a resin substrate.

24. A wireless communications apparatus comprising the near-field communication antenna recited in claim 6.

* * * * *